United States Patent
Metz et al.

(10) Patent No.: US 6,757,430 B2
(45) Date of Patent: *Jun. 29, 2004

(54) IMAGE PROCESSING ARCHITECTURE

(75) Inventors: Werner Metz, Chandler, AZ (US);
Tinku Acharya, Chandler, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/473,643

(22) Filed: Dec. 28, 1999

(65) Prior Publication Data

US 2003/0194129 A1 Oct. 16, 2003

(51) Int. Cl.$^7$ .................................................. G06K 9/34
(52) U.S. Cl. ........................................ 382/173; 358/462
(58) Field of Search ............................... 382/173–176, 382/232–233, 302–330, 276–279, 299–300; 707/531, 514, 530, 515; 358/462, 1.9, 1.6; 345/733, 744, 559, 535, 502; 715/520, 514, 517, 907; 709/200–211; 710/313, 113

(56) References Cited

U.S. PATENT DOCUMENTS

| | | | | |
|---|---|---|---|---|
| 4,539,653 A | * | 9/1985 | Bartlett et al. | 715/520 |
| 5,228,121 A | * | 7/1993 | Fontaine et al. | 707/531 |
| 5,737,549 A | * | 4/1998 | Hersch et al. | 709/203 |
| 5,956,493 A | * | 9/1999 | Hewitt et al. | 710/113 |
| 6,233,353 B1 | * | 5/2001 | Danisewics | 382/176 |
| 6,281,893 B1 | * | 8/2001 | Goldstein | 345/733 |

* cited by examiner

*Primary Examiner*—Leo Boudreau
*Assistant Examiner*—Ishrat Sherali
(74) *Attorney, Agent, or Firm*—Trop, Pruner & Hu, P.C.

(57) ABSTRACT

A system includes a central processing unit, a bus and circuit. The central processing unit is coupled to the bus and segments an image into at least one text region and at least one graphics region. At least one of the circuit modules is associated with the processing of the text region(s), and at least one of the circuit modules is associated with the processing of the graphics region(s).

21 Claims, 4 Drawing Sheets

CHAIN: $60_A$ → $60_B$ → $60_C$
PRIORITY: 3   2   1

CHAIN: $60_B$ → $60_C$ → $60_A$
PRIORITY: 3   2   1

CHAIN: $60_C$ → $60_B$
PRIORITY: 2   1

IMAGE PROCESSING ARCHITECTURE

BACKGROUND

The invention generally relates to an image processing architecture.

A typical digital reprographics system may perform the following operations. First, the system may scan a document to form digital image data that electrically represents the document. Next, the system may segment the image into text regions and graphics regions and then process the images using techniques that are tailored for the specific text and graphics regions. For example, the system may compress the data that indicates the text and graphics regions to reduce the amount of data that is used to represent the image. After the compression, the compressed image data may be stored in mass storage, communicated to another computer, further enhanced, or reproduced on a printer, as just a few examples.

A conventional reprographics system may include a central processing unit (CPU) to perform the segmentation, compression and other image enhancement functions. However, unfortunately, the CPU may become overburdened with the above-described functions and may not be able to perform at its full capability.

Thus, there is a continuing need for an arrangement that addresses one or more of the problems that are stated above.

SUMMARY

In an embodiment of the invention, a system includes a central processing unit, a bus and circuit modules. The central processing unit is coupled to the bus and segments an image into at least one text region and at least one graphics region. At least one of the circuit modules is associated with processing the text region(s), and at least one of the circuit modules is associated with processing the graphics region(s).

Advantages and other features of the invention will become apparent from the following drawing, from the description and from the claims.

DETAILED DESCRIPTION

Figure 1:
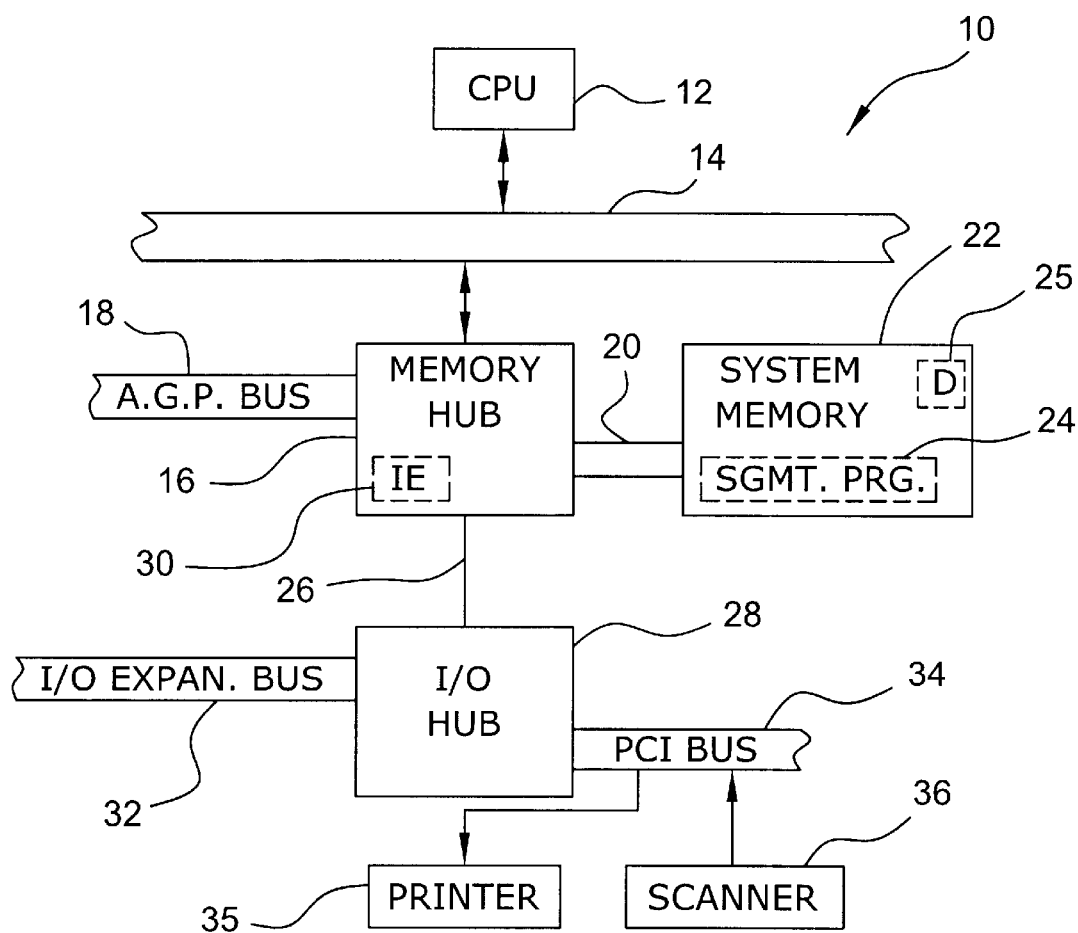
FIG. 1 is a schematic diagram of a computer system.
Figure 3:
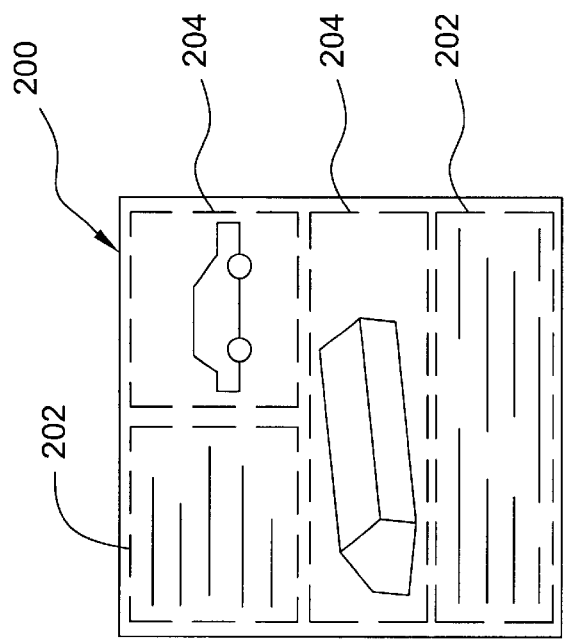
FIG. 3 is an illustration depicting an image processed by the computer system of FIG. 1.

Referring to FIG. 1, an embodiment 10 of a computer system in accordance with the invention includes a general purpose processor, such a central processing unit (CPU) 12, that processes data indicative of an image to segment the image into text regions 202 (see FIG. 3) and graphics regions 204. As an example, the computer system 10 may be a digital reprographics system, and the image data may be generated by a scanner 36 that scans a document to be enhanced or reproduced. After segmenting the image, the CPU 12 programs an imaging engine 30 (part of a memory hub 16, or north bridge), with text and graphics segmentation boundaries that define the text 202 and graphics 204 regions of the image 200. Based on these segmentation boundaries, the imaging engine 30 begins processing the image data in hardware (as described below) by retrieving data (from a system memory 22) that is associated with the text and graphics regions and performing such functions as enhancement and compression of the text 202 and graphics 204 regions, as examples. Once the imaging engine 30 completes its processing, the imaging engine 30 may store the processed data in the system memory 22 where the CPU 12, might, for example, use the processed data to form a hardcopy on a printer 35, store the processed data in mass storage or communicate the processed data to another computer system, as just a few examples.

Figure 2:
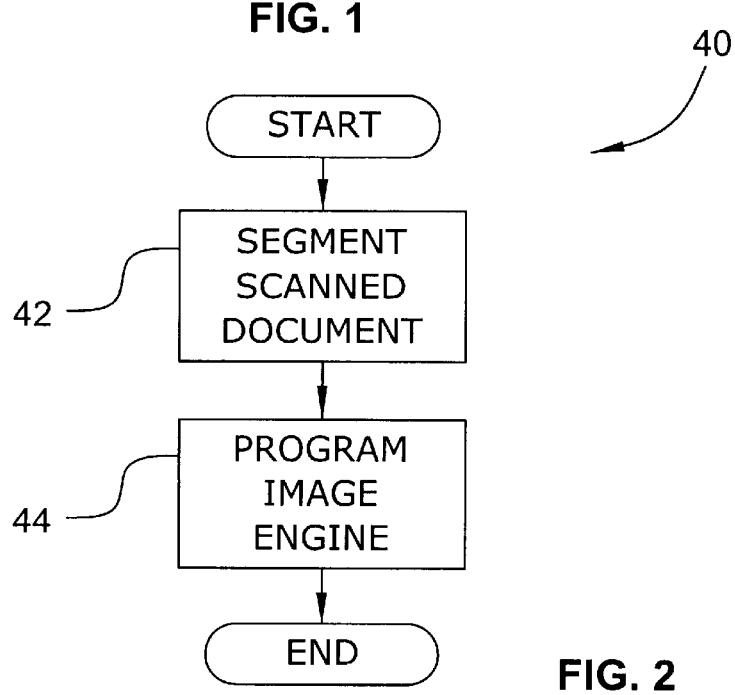
FIG. 2 is a flow diagram illustrating processing of a scanned document by the computer system of FIG. 1.

To accomplish these goals, in some embodiments, the CPU 12 may execute a segmentation program 24 (stored in the system memory 22, for example) to segment (block 42) (see FIG. 2) of the image and program (block 44) the image engine 30 with the segment boundaries. For example, the CPU 12 may program the imaging engine 30 with the address boundaries of the text and graphics regions, as described below.

Because the CPU 12 performs the segmentation of the image and the hardware of the imaging engine 30 performs the additional processing of the image, the functions of the computer system 10 are divided between the data type dependent loads that are handled by the imaging engine 30 and the data independent loads that are handled by the CPU 12. As a result, the segmentation program 24 may be continually updated and even replaced to accommodate different and improved algorithms for segmentation. However, the hardware functions that are provided by the imaging engine 30 may be generally repetitive in nature, a function not performed by a general purpose processor, such as the CPU 12 but may be more easily performed by the circuits of the imaging engine 30, as described below.

Figure 4:
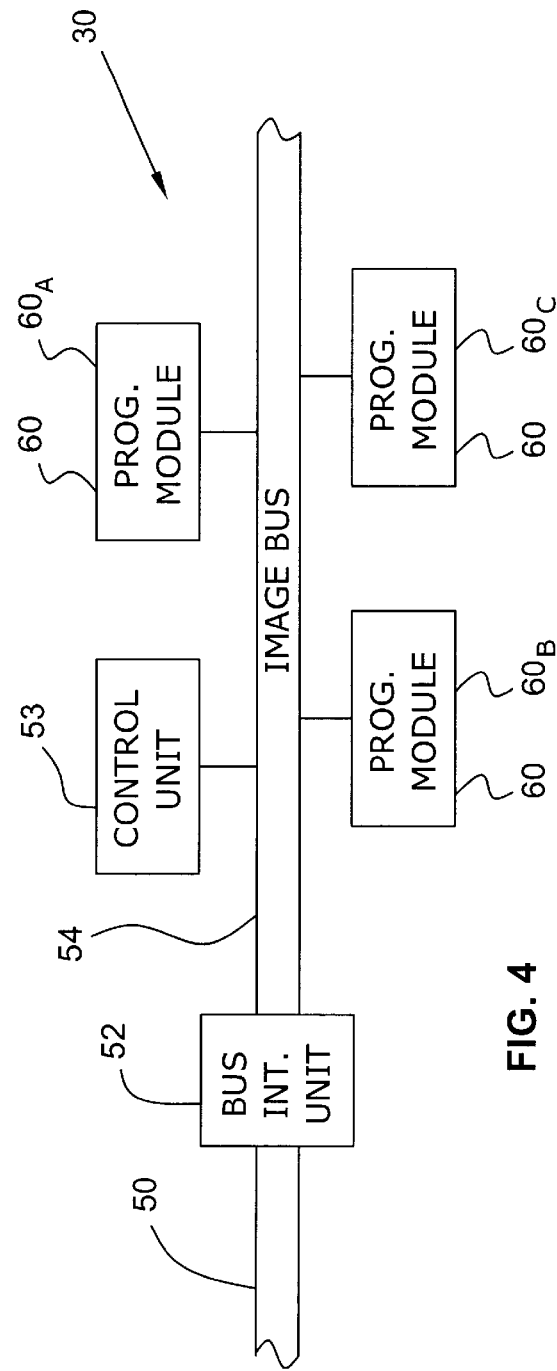
FIG. 4 is a schematic diagram of an imaging engine of a bridge of the computer system of FIG. 1 according to an embodiment of the invention.

Referring to FIG. 4, in some embodiments, the imaging engine 30 may include an internal image bus 54 that communicates the image data among programmable circuit modules 60 (modules $60_A$, $60_B$ and $60_C$, as just a few examples). The image bus 54 may be coupled to another external bus 50 via a bus interface unit 52. As examples, the bus 50 may be a local bus 14 (see FIG. 1) of the computer system, such as an Accelerated Graphics Port (AGP) bus 18 or a Peripheral Component Interconnect (PCI) bus 34, as just a few examples. The AGP standard is described in detail in the Accelerated Graphics Port Interface Specification, Revision 1.0, published on Jul. 31, 1996, by Intel Corporation of Santa Clara, Calif.; and the PCI Specification is available from The PCI Special Interest Group, Portland, Oreg. 97214.

Each circuit module 60 may be programmed by the CPU 12 to perform a function that is associated with the processing of the text regions or a function that is associated with the processing of the graphics regions. Furthermore, the circuit modules 60 may be programmed by the CPU 12 to process the graphics or text data in a predefined order to form a processing chain. In this manner, the CPU 12 may program the programmable modules 60 to form a graphics processing chain and a text processing chain.

Figures 5, 6, 7, 8:
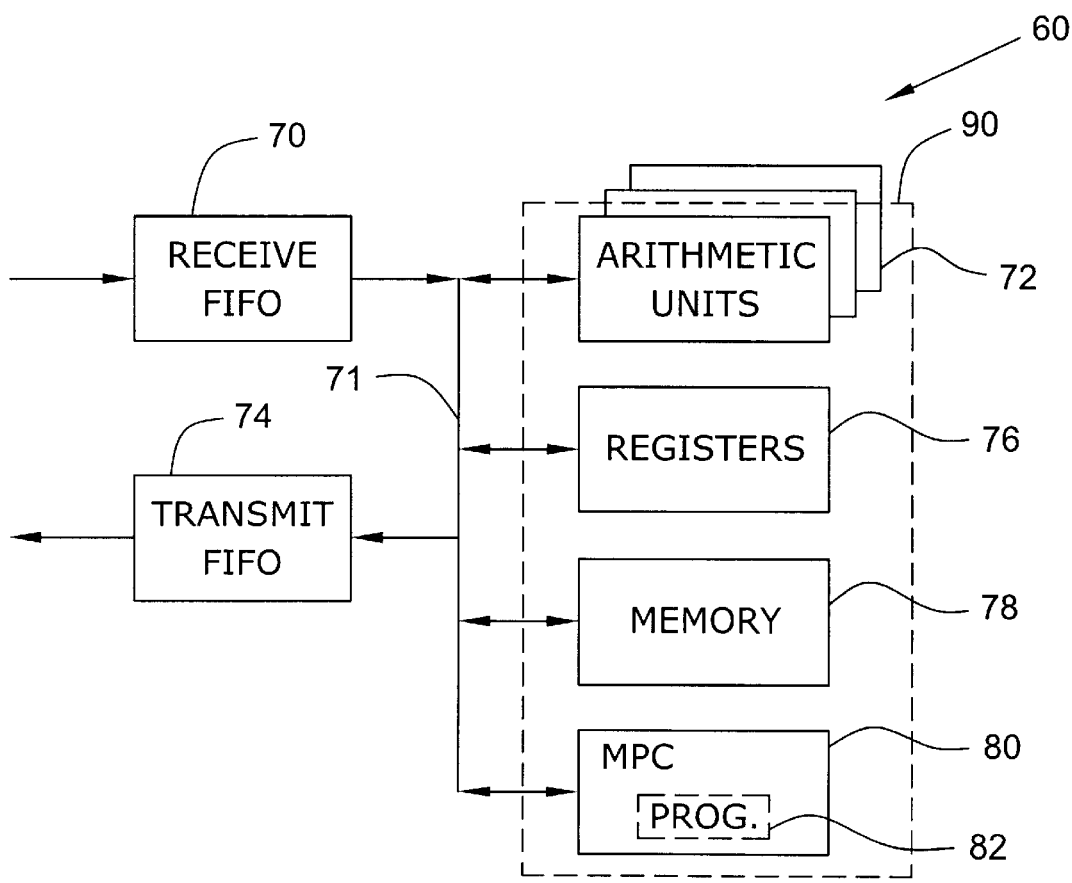
FIGS. 5, 6 and 7 illustrate different processing chains that may be formed from programmable circuit modules of FIG. 4 according to different embodiments of the invention.
FIG. 8 is a schematic diagram of a programming module of FIG. 4 according to an embodiment of the invention.

For example, referring to FIG. 5, for a particular processing chain, the CPU 12 may program the modules 60 so that the module $60_A$ processes the graphics\text data first, the module $60_B$ processes the graphics\text data that results from the processing performed by the module $60_A$ and the module $60_C$ processes the graphics\text data that results from the process performed by the module $60_B$. As an example, this processing chain may be used to perform an image enhancement function to the graphics regions 204. In this manner, the module $60_A$ may perform transformation and low pass filtering functions; the module $60_B$ may then use the transformed data to produce Joint Picture Expert Group (JPEG) zig-zag data arrangement ordering and run length and encoding; and the module $60_C$ may perform entropy encoding (Huffman encoding, for example). It is noted that the order of the processing chain may be reconfigured, as depicted in FIG. 6 in which the order of data processing is the following: module $60_B$ to $60_C$ to $60_A$. Furthermore, not all of the modules 60 have to be utilized for a particular processing chain. For example, FIG. 7 depicts a processing chain that uses two modules 60 ($60_C$ (having the highest processing priority) and $60_B$ (having the lowest processing priority). In some embodiments, a particular module 60 may form part of a text processing chain and part of a graphics processing chain.

Not only may the CPU 12 set the processing priority of the module 60, the CPU 12 may also program the priority of the module 60 when requesting ownership of the imaging bus 54. More particularly, in some embodiments, the CPU 12 assigns each programming module 60 a bus arbitration priority, and in some embodiments, the CPU 12 may assign the arbitration priorities in the reverse order of the processing order priorities for the following reasons. The reverse order arbitration priorities establish a "pull" architecture so that the last operation to be performed in the processing chain has the highest priority on the bus. Due to this arrangement, limited data storage is required in the programming modules 60, as the data is "pulled" from each module instead of being stored to await the processing by a particular module 60. This storage effect that may create a "bubble" in the processing chain, an event circumvented by the pull architecture. Thus, as depicted in FIGS. 5, 6 and 7 the first module 60 in the processing chain has the lowest priority, and the last processing module 60 in the processing chain has the highest priority.

Referring to FIG. 8, as an example, each module 60 may include a receive first-in-first-out (FIFO) memory 70 that receives data to be processed by circuitry 90 that establishes the function of the module 60. For example, this function may involve compressing data, decompressing data, reordering addresses of the data, scaling, convolution and/or filtering, as just a few examples. As an example, the circuitry 90 may include arithmetic units 72, each of which may perform an addition, subtraction, shift or rotate function to perform part of an arithmetic function. In this manner, the data from the receive FIFO 70 may be communicated over an internal bus 71 of the module 60 and processed in parallel by the various arithmetic units 72. The circuitry 90 may also include a memory that is coupled to the internal bus 71 and may be used to temporarily store data that is a result of the processing. A master program controller (MPC) 80 of the circuitry 90 coordinates and controls the functions performed by the arithmetic units 72.

To configure the modules 60, the MPC 80 may include a memory that stores a program 82, such as microcode, that causes the MPC 80 to use and program the arithmetic units 72 in a manner that defines the various functions performed by the arithmetic units 72. The circuitry may also include registers that may, for example, store such information as the base addresses of the text and/or graphics region in the system memory 22 and store such other information as the processing priority and/or bus arbitration priority. As depicted in FIG. 8, besides the FIFO memory 70 and the circuitry 90, the module 60 may include a transmit FIFO 70 for storing data that is to be communicated to the image bus 54.

Figure 9:
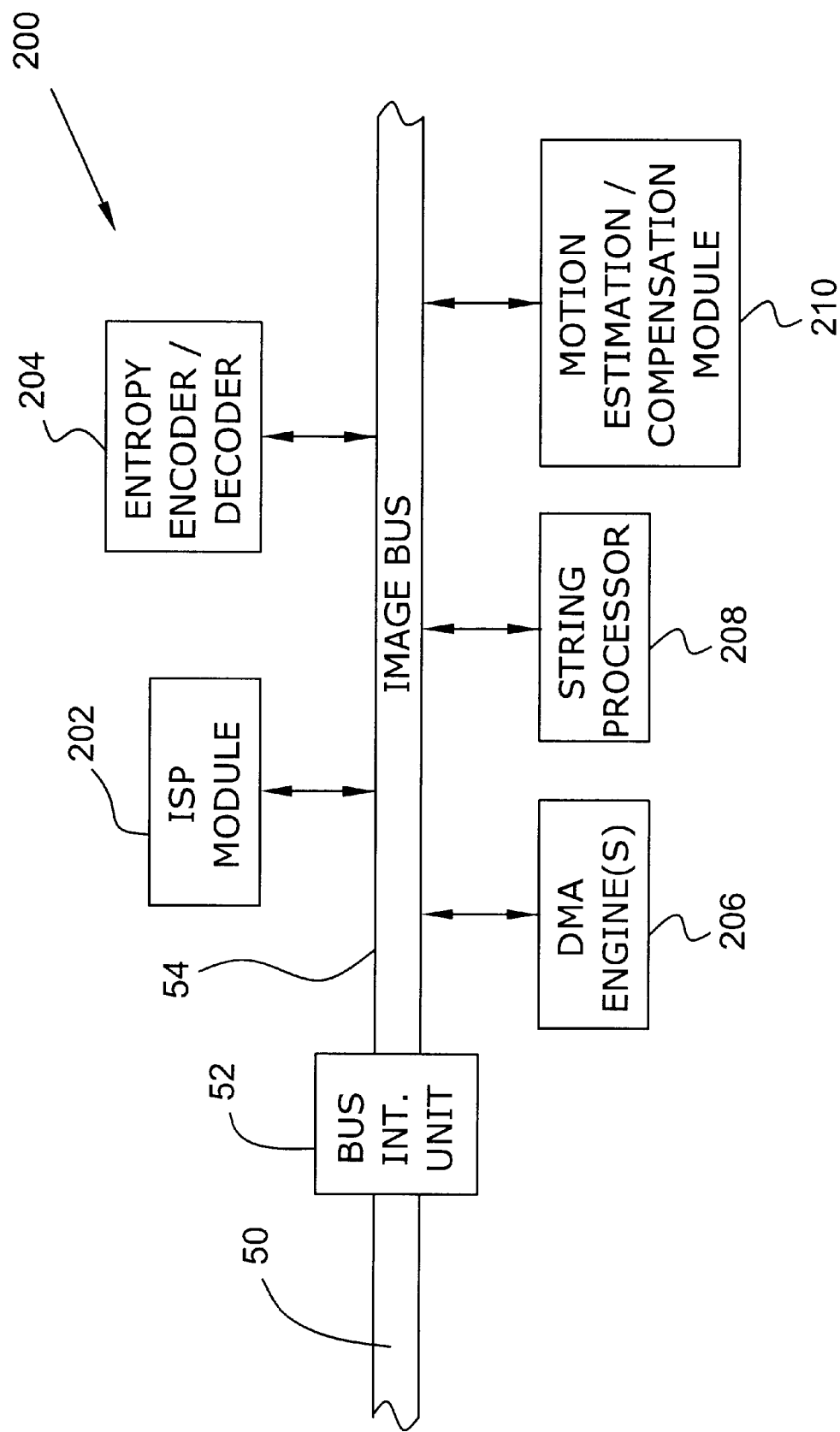
FIG. 9 is a schematic diagram of the imaging engine according to an embodiment of the invention.

As a more specific example, FIG. 9 depicts an imaging engine 200 that is, in general, similar in design to the programming module that is depicted in FIG. 4. In particular, the module 200 includes an image signal processing (ISP) module 202 that is similar in design to the module 60 that is depicted in FIG. 8. The module 200 may also include an entropy encoder/decoder 204, a programming module that may be defined by various arithmetic units, as described above. Another module 60 of the imaging engine 200 may be a string processor 208, a module that may perform such functions as string matching, string edits and string searches for the text regions of the image 200. As another example, the imaging engine 200 may include a motion estimation/compensation module 200 that performs motion estimation and compensation for video. The imaging engine 200 may also include another programming module to transfer data to and from the system memory 22, such as direct memory access (DMA) engine 206.

Thus, the modules 60 (see FIGS. 5 and 6) are programmable so that a particular module 60 may perform different kinds of operations depending on the microcode that is stored in the MPC 80 by driver firmware. For example, the same module 60 may be programmed to do image transforms, filtering, scaling, etc. However, the module 60 is not limited to performing two-dimensional (2-D) signal processing operations for imaging applications. Hence the architecture has two levels of programmability, one in programming the data flow between the modules 60 to accomplish a chain of processing functions. The second programming capability is to program each individual module 60 for different functions. Thus, the architecture is reconfigurable due to the two levels of programming.

Referring back to FIG. 1, among the other features of the computer system 10, the computer system 10 may include a south bridge, or input/output (I/O) hub 28, that communicates via a hub link 26 with the memory hub 16. The I/O hub 28 may, as examples, provide interfaces to an I/O expansion bus 32 and the PCI bus 34. The scanner 36 and the printer 35 may be coupled to the PCI bus 34.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A computer system comprising:
   a central processing unit to segment an image into at least one text region and at least one graphics region;
   a bus coupled to the central processing unit; and
   circuit modules separate from the central processing unit, at least one of the circuit modules being associated with the processing of said at least one text region and at least one of the circuit modules being associated with the processing of said at least one graphics region,
   wherein at least one of the circuit modules comprises at least one register programmable by the central processing unit to define an arbitration hierarchy on the bus among the circuit modules.

2. A bridge comprising:
an interface to receive indications of the boundaries of text regions and graphics regions of an image from a central processing unit;
a central processing unit to segment an image into at least one text region and at least one graphics region;
a bus; and
circuit modules coupled to the bus and separate from the central processing unit, some of the circuits being associated with the processing of said at least one text region and some of the circuit modules being associated with the processing of said at least one graphics region,
wherein at least one of the modules, comprises a register programmable by the central processing unit to define an arbitration hierarchy on the bus.

3. A method comprising:
segmenting an image into at least one text region and at least one graphics region using a central processing unit;
using a first group of hardware modules separate from the central processing unit to process said at least one text region of the image;
programming the hardware modules of the first group with a first processing order among the hardware modules of the first group to define a text processing chain;
using a second group of hardware modules separate from the central processing unit to process said at least one graphics region of the image; and
programming the hardware modules of the second group with a second processing order among the hardware modules of the second group to define a graphics processing chain.

4. The method, of claim 3, wherein programming the hardware modules of the first group to define an arbitration hierarchy on the bus among the hardware modules of the first group.

5. The method of claim 3, wherein at least one of the modules is part of both the first and second groups.

6. A computer system comprising:
a central processing unit to segment an image into at least one text region and at least one graphics region;
a bus coupled to the central processing unit; and
circuit modules separate from the central processing unit, at least one of the circuit modules being associated with the processing of said at least one text region and at least one of the circuit modules being associated with the processing of said at least one graphics region,
wherein said at least one of the circuit modules associated with the processing of said at least one text region comprises at least one register programmable by the central processing unit to define a processing order among the circuit modules to form a text processing chain.

7. The computer system of claim 6, wherein at least one of the circuit modules comprises at least one register programmable by the central processing unit to define an arbitration hierarchy on the bus among the circuit modules.

8. The computer system of claim 6, wherein at least one of the circuit modules is associated with the processing of both the text and graphics regions.

9. The computer system of claim 6, wherein said at least one of the modules associated with the processing of said at least one graphics region comprises:
another bus;
a memory coupled to said another bus to store data indicative of at least part of said at least one graphics region;
arithmetic logic units coupled to said another bus; and
a controller coupled to said another bus to control the arithmetic logic units to perform a function on the data.

10. The computer system of claim 9, wherein the function involves compressing the data.

11. The computer system of claim 9, wherein the function involves decompressing the data.

12. The computer system of claim 9, wherein the function involves scaling the data.

13. The computer system of claim 9, wherein the function involves convolution of the data.

14. A computer system comprising:
a central processing unit to segment an image into at least one text region and at least one graphics region;
a bus coupled to the central processing unit; and
circuit modules separate from the central processing unit, at least one of the circuit modules being associated with the processing of said at least one text region and at least one of the circuit modules being associated with the processing of said at least one graphics region,
wherein said at least one of the modules associated with the processing of said at least one graphics region comprises at least one register programmable by the central processing unit to define a processing order among the circuit modules to form a graphics processing chain.

15. The computer system of claim 14, wherein at least one of the circuit modules comprises at least one register programmable by the central processing unit to define an arbitration hierarchy on the bus among the circuit modules.

16. The computer system of claim 14, wherein at least one of the circuit modules is associated with the processing of both the text and graphics regions.

17. The computer system of claim 14, wherein said at least one of the modules associated with the processing of said at least one graphics region comprises:
another bus;
a memory coupled to said another bus to store data indicative of at least part of said at least one graphics region;
arithmetic logic units coupled to said another bus; and
a controller coupled to said another bus to control the arithmetic logic units to perform a function on the data.

18. The computer system of claim 17, wherein the function involves compressing the data.

19. The computer system of claim 17, wherein the function involves decompressing the data.

20. The computer system of claim 17, wherein the function involves scaling the data.

21. The computer system of claim 17, wherein the function involves convolution of the data.

* * * * *